(12) United States Patent
Kudo

(10) Patent No.: US 10,791,596 B2
(45) Date of Patent: Sep. 29, 2020

(54) ANALOG SIGNAL INPUT/OUTPUT DEVICE AND CONTROL METHOD FOR ANALOG SIGNAL INPUT/OUTPUT DEVICE

(71) Applicant: OMRON Corporation, Kyoto-shi, Kyoto (JP)

(72) Inventor: Masaya Kudo, Osaka (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/642,476

(22) PCT Filed: Nov. 26, 2018

(86) PCT No.: PCT/JP2018/043431
§ 371 (c)(1),
(2) Date: Feb. 27, 2020

(87) PCT Pub. No.: WO2019/130939
PCT Pub. Date: Jul. 4, 2019

(65) Prior Publication Data
US 2020/0205257 A1    Jun. 25, 2020

(30) Foreign Application Priority Data

Dec. 26, 2017 (JP) ................................. 2017-249411

(51) Int. Cl.
*H05B 45/10* (2020.01)
*H05B 37/02* (2006.01)
(Continued)

(52) U.S. Cl.
CPC ............... *H05B 45/10* (2020.01); *G01D 7/00* (2013.01); *G01J 1/44* (2013.01); *G01V 8/10* (2013.01); *H05B 47/105* (2020.01)

(58) Field of Classification Search
CPC ........ H05B 45/10; H05B 45/37; H05B 37/02; G01D 7/00; G01D 7/002; G06F 3/002;
(Continued)

(56) References Cited

U.S. PATENT DOCUMENTS

2008/0318541 A1    12/2008 Kimoto
2009/0312604 A1    12/2009 Kimoto et al.
(Continued)

FOREIGN PATENT DOCUMENTS

JP    S56-77715 A    6/1981
JP    2008-28514 A    2/2008
(Continued)

OTHER PUBLICATIONS

English translation of the International Search Report("ISR") of PCT/JP2018/043431 dated Jan. 29, 2019.
(Continued)

*Primary Examiner* — Thai Pham
(74) *Attorney, Agent, or Firm* — Metrolex IP Law Group, PLLC

(57) ABSTRACT

The indication of an input or output level of an analog signal is given at low production cost and without the need for a wide space to install a configuration for indicating the input or output level. An analog signal input device (1) includes: a voltage detecting section (130) configured to detect an input or output level of an analog signal; and an LED lighting control section (132) configured to control a pattern of light emission of an LED (15) in accordance with the input or output level of the analog signal.

4 Claims, 4 Drawing Sheets

(51) Int. Cl.
*H04B 3/46* (2015.01)
*G01D 7/00* (2006.01)
*H05B 47/105* (2020.01)
*G01J 1/44* (2006.01)
*G01V 8/10* (2006.01)

(58) Field of Classification Search
CPC .. G06F 13/00; H04B 3/46; H04B 1/40; H04B 1/406; G09F 13/20
See application file for complete search history.

(56) References Cited

U.S. PATENT DOCUMENTS

| | | | | |
|---|---|---|---|---|
| 2010/0295997 | A1* | 11/2010 | Chen | H04N 9/73 348/655 |
| 2013/0264961 | A1* | 10/2013 | Chang | H05B 45/37 315/201 |
| 2014/0328427 | A1* | 11/2014 | Chang | H05B 45/10 375/271 |
| 2017/0020378 | A1* | 1/2017 | Godo | A61B 1/0638 |

FOREIGN PATENT DOCUMENTS

| | | |
|---|---|---|
| JP | 2009-85896 A | 4/2009 |
| JP | 2011-75332 A | 4/2011 |
| JP | 2012-254112 A | 12/2012 |
| JP | 2014-157523 A | 8/2014 |
| JP | 2014-178785 A | 9/2014 |
| WO | 2007/026890 A1 | 3/2007 |

OTHER PUBLICATIONS

Written Opinion ("WO") of PCT/JP2018/043431 dated Jan. 29, 2019.

The International Preliminary Report on Patentability (IPRP) of PCT/JP2018/043431 dated Apr. 14, 2020.

* cited by examiner

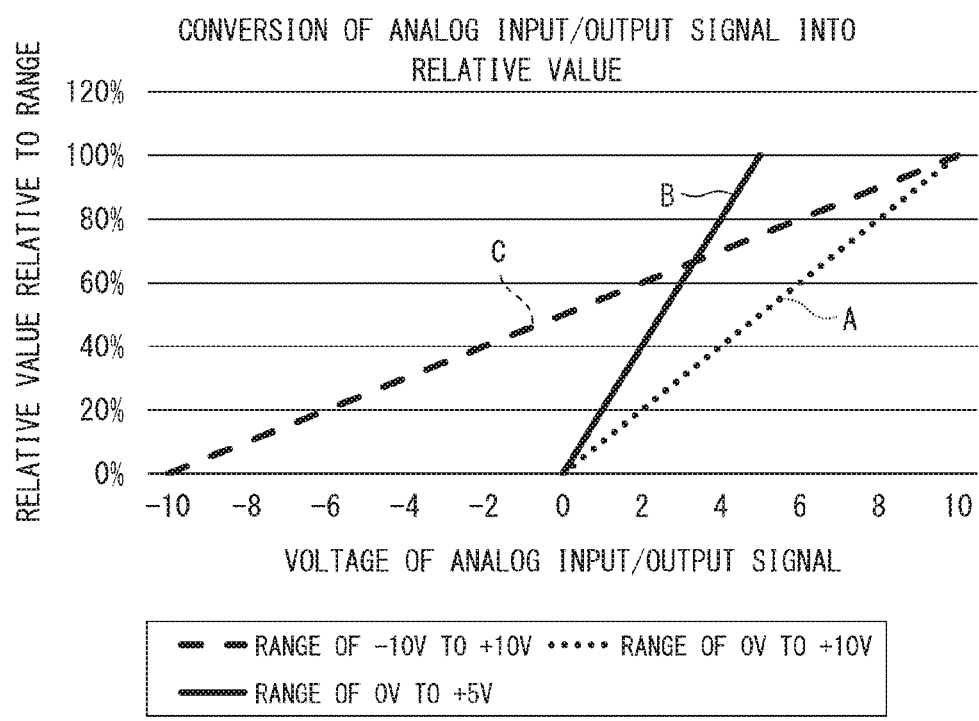

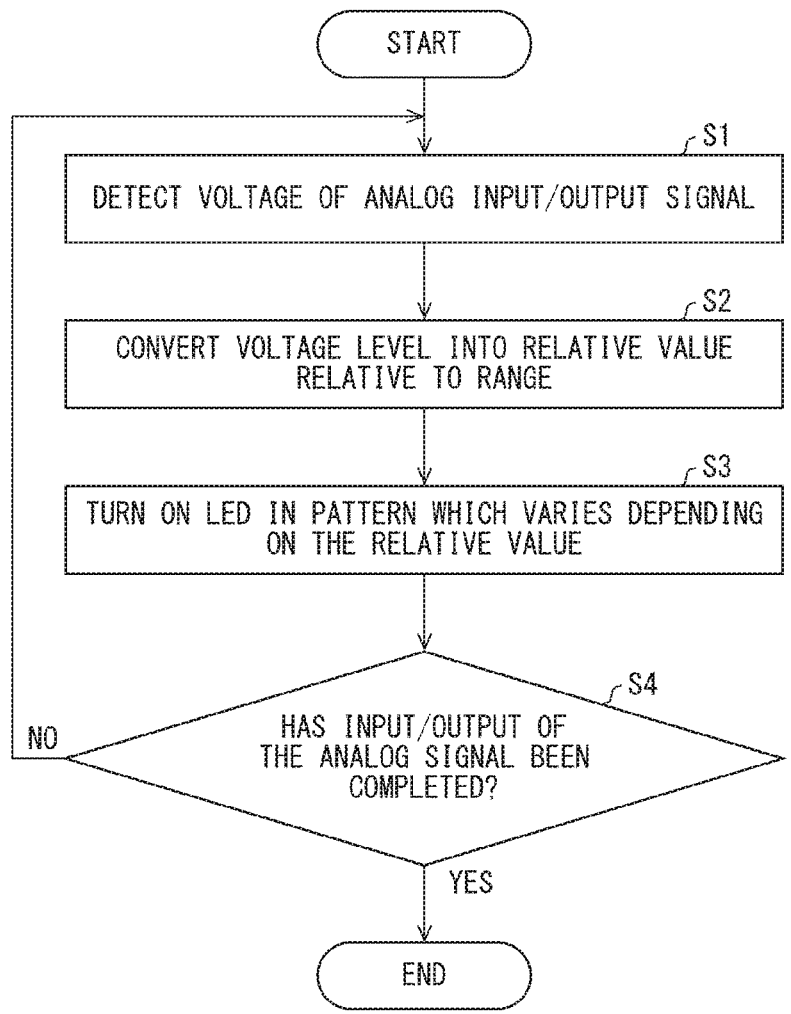

ANALOG SIGNAL INPUT/OUTPUT DEVICE AND CONTROL METHOD FOR ANALOG SIGNAL INPUT/OUTPUT DEVICE

TECHNICAL FIELD

The present invention relates to an analog signal input/output device which performs at least one of input and output of an analog signal.

BACKGROUND ART

For example, Patent Literature 1 discloses, as a device that inputs or outputs an analog signal, a process input/output device which is equipped to perform a calibration procedure and display the calibration procedure. Specifically, the process input/output device controls lighting of an LED, depending on a step of a calibration test of an input/output circuit.

CITATION LIST

Patent Literature

[Patent Literature 1] Japanese Patent Application Publication Tokukai No. 2014-178785 (Published on Sep. 25, 2014)

SUMMARY OF INVENTION

Technical Problem

In a case where connection between an analog signal input/output device and an external apparatus is made, the need may arise to check whether they have been properly connected. Further, in a case where a failure occurs during the operation of the analog signal input/output device, the need may arise to determine the cause of the failure. For example, the need may arise to determine whether the failure is caused by the analog signal input/output device or whether the failure is caused by a factor outside the analog signal input/output device (defective wiring or a failure of an apparatus to which the analog signal input/output device is connected). In such a case, it is important to check the input or output level of the analog signal in the analog signal input/output device.

However, the conventional technique as described above is not a technique based on the viewpoint of indicating to the user the input or output level of the analog signal. For example, in order to display the input or output level of an analog signal, it is necessary to install, in the analog signal input/output device, a configuration for displaying the input or output level of an analog signal, such as a seven-segment LED, a liquid crystal display device, or an analog meter. Installing such a configuration in the analog signal input/output device increases a production cost. Further, in order to install the configuration as described above in the analog signal input/output device, it is necessary to provide a space for installing the configuration.

It is an object of an aspect of the present invention to provide an analog signal input/output device capable of indicating an input or output level of an analog signal, at low production cost and without the need for a wide space to install a configuration for indicating the input or output level.

Solution to Problem

In order to solve the above problems, an analog signal input/output device in accordance with an aspect of the present invention is an analog signal input/output device which includes a light emitting element and performs at least one of input and output of an analog signal, the analog signal input/output device including: an input/output level detecting section configured to detect at least one of an input level and an output level of the analog signal; and a light emission control section configured to control an on and off pattern of light emission of the light emitting element in accordance with the input level or the output level of the analog signal.

Further, a method of controlling an analog signal input/output device in accordance with an aspect of the present invention is a method of controlling an analog signal input/output device which includes a light emitting element and performs at least one of input and output of an analog signal, the method including: an input/output level detecting step of detecting at least one of an input level and an output level of the analog signal; and a light emission controlling step of controlling an on and off pattern of light emission of the light emitting element in accordance with the input level or the output level of the analog signal.

Advantageous Effects of Invention

According to the aspects of the present invention, it is possible to indicate an input or output level of an analog signal by a light emission pattern of one light emitting element.

BRIEF DESCRIPTION OF DRAWINGS

FIG. 4 is a diagram showing correspondence between a voltage level of an analog input/output signal and a relative value for the voltage level relative to a range in accordance with an embodiment of the present invention.

FIG. 5 is a flowchart illustrating one example of the flow of processes carried out by an analog signal input device in accordance with an embodiment of the present invention.

DESCRIPTION OF EMBODIMENTS

Embodiment 1

The following description will discuss an embodiment in accordance with an aspect of the present invention (hereinafter also referred to as "the present embodiment") with reference to the drawings.

§ 1 Application

Figure 2:
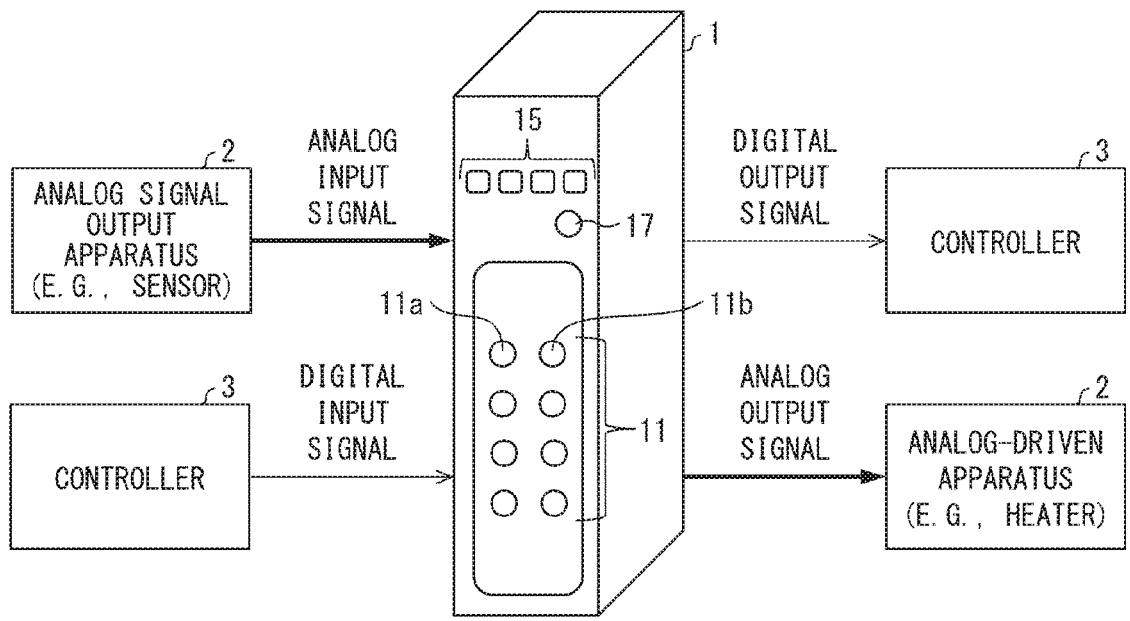
FIG. 2 is a diagram illustrating an overview of an application for an analog signal input/output device in accordance with an embodiment of the present invention.

FIG. 2 is a diagram illustrating one example of an application for an analog signal input/output device in accordance with the present embodiment. First, an overview of an application of the analog signal input/output device will be discussed with reference to FIG. 2.

As illustrated in FIG. 2, an analog signal input device 1 is a device to which an analog signal is inputted via an input/output terminal 11 from an analog signal output apparatus such as a sensor. For example, the analog signal input device 1 may be an A/D converter for converting an analog signal into a digital signal. In this case, the analog signal input device 1 outputs a digital signal to a controller 3 via a controller communication terminal 17. The analog signal input device 1 detects an input level of an inputted analog signal. The analog signal input device 1 controls an on and off pattern of light emission of an LED (light emitting element) 15, which is provided in the analog signal input device 1, in accordance with the detected input level of the analog signal. As such, the analog signal input device 1 allows the LED 15 to light up in a pattern which varies depending on the input level of the analog signal.

Note that, in the present embodiment, a specific example for the analog signal input device 1 which indicates an input level of an inputted analog signal is provided. Alternatively, as illustrated in FIG. 2, the present embodiment may be applied to an analog signal output device, instead of the analog signal input device 1. In this case, the analog signal output device converts, for example, a digital signal outputted from the controller 3 into an analog signal. The analog signal output device outputs the analog signal to an apparatus which is driven by an analog signal (e.g., a heater that requires temperature control). By appropriately changing the configuration of the analog signal input device 1, the analog signal output device indicates an output level of an analog signal by a light emission pattern of the LED.

Further, the present embodiment may be applied to a device for inputting an analog signal and a digital signal, a device for outputting an analog signal and a digital signal, a device for inputting and outputting an analog signal and a digital signal, and the like. These devices indicate at least one of an input level and an output level of an analog signal.

With the above-described configuration, it is possible to indicate the input or output level of an analog signal by a light emission pattern of a single LED. As such, the above-described configuration achieves reduction in production cost of the analog signal input/output device, in comparison to the configuration in which the input or output level of an analog signal is numerically displayed by a seven-segment LED, the configuration in which the input or output level of an analog signal is indicated by liquid crystal display, the configuration in which the input or output level of an analog signal is indicated by an analog meter or the like, and other configuration. Further, with the above-described configuration, it is possible to save space necessary for providing a configuration for indicating the input or output level of an analog signal. Therefore, it is possible to improve the degree of freedom in the design of the analog signal input/output device.

§ 2 Configuration Example (System 9)

Figure 3:
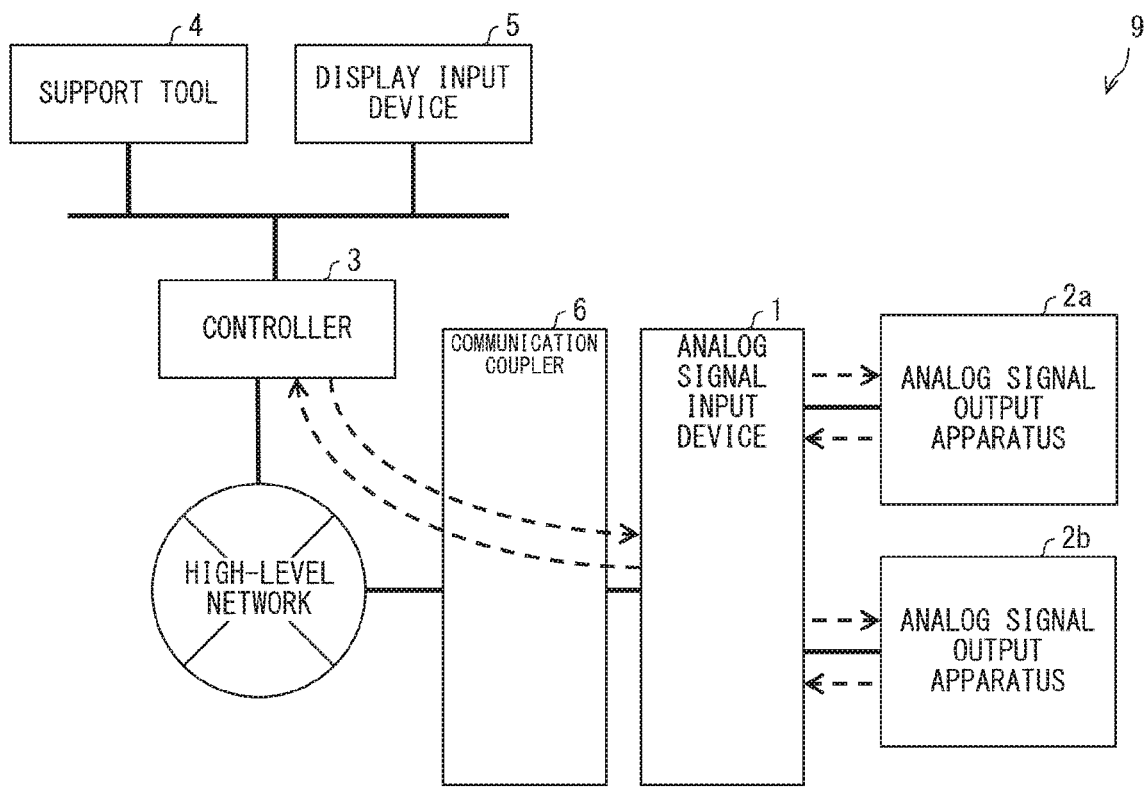
FIG. 3 is a diagram illustrating an overview of one example of a system in accordance with an embodiment of the present invention.

FIG. 3 is a diagram illustrating an overview of one example of a system 9 in accordance with the present embodiment. As illustrated in FIG. 3, the system 9 includes an analog signal input device, an analog signal output apparatus 2, a controller 3, a support tool 4, a display input device 5, and a communication coupler 6.

(Analog Signal Input Device 1)

As illustrated in FIG. 3, the analog signal input device 1 is a relay device which relays data between a high-level network, which includes the controller 3 and others, and the analog signal output apparatus 2. In the present embodiment, an example case where the analog signal input device 1 is an A/D converter is provided.

(Communication Coupler 6)

The communication coupler 6 is a relay device which relays communication between the high-level network and the analog signal input device 1. The communication coupler 6 relays communication between an apparatus included in the high-level network and the analog signal input device 1.

(Analog Signal Output Apparatus 2)

As illustrated in FIG. 3, the analog signal output apparatus 2 is an apparatus which is connected to the analog signal input device 1 and is subject to control by the controller 3. Examples of the analog signal output apparatus 2 include various kinds of sensors such as a photoelectronic sensor and a proximity sensor.

(Controller 3)

The controller 3 is a control device which performs centralized control of the whole of the system 9, and is also referred to as programmable logic controller (PLC). The controller 3 operates as a master device of the analog signal input device 1 in the system 9.

(Support Tool 4)

The support tool 4 is a device which is used, in a state of being connected to the system 9, for various settings of the system 9 such as operation settings of the analog signal input device 1. The support tool 4 can be connected to the system 9 via the controller 3. The support tool 4 can be an information processing device such as a personal computer and can also be a portable information processing device such as a notebook computer. Note that the support tool 4 may be adapted to be connected to the analog signal input device 1 via the communication coupler 6 to perform various settings.

(Display Input Device 5)

The display input device 5 is, for example, a display input device of a touch panel type. A user of the system 9 can operate the controller 3 via the display input device 5 and can check the operation status of the system 9 on the display input device 5.

Further, in the system 9 illustrated in FIG. 3, in a case where the controller 3 is configured to input/output an analog signal, the controller 3 may include the configuration, which is provided in the analog signal input device 1, for indicating the input level (or the output level) of an analog signal.

(Configuration of Analog Signal Input Device 1)

Figure 1:
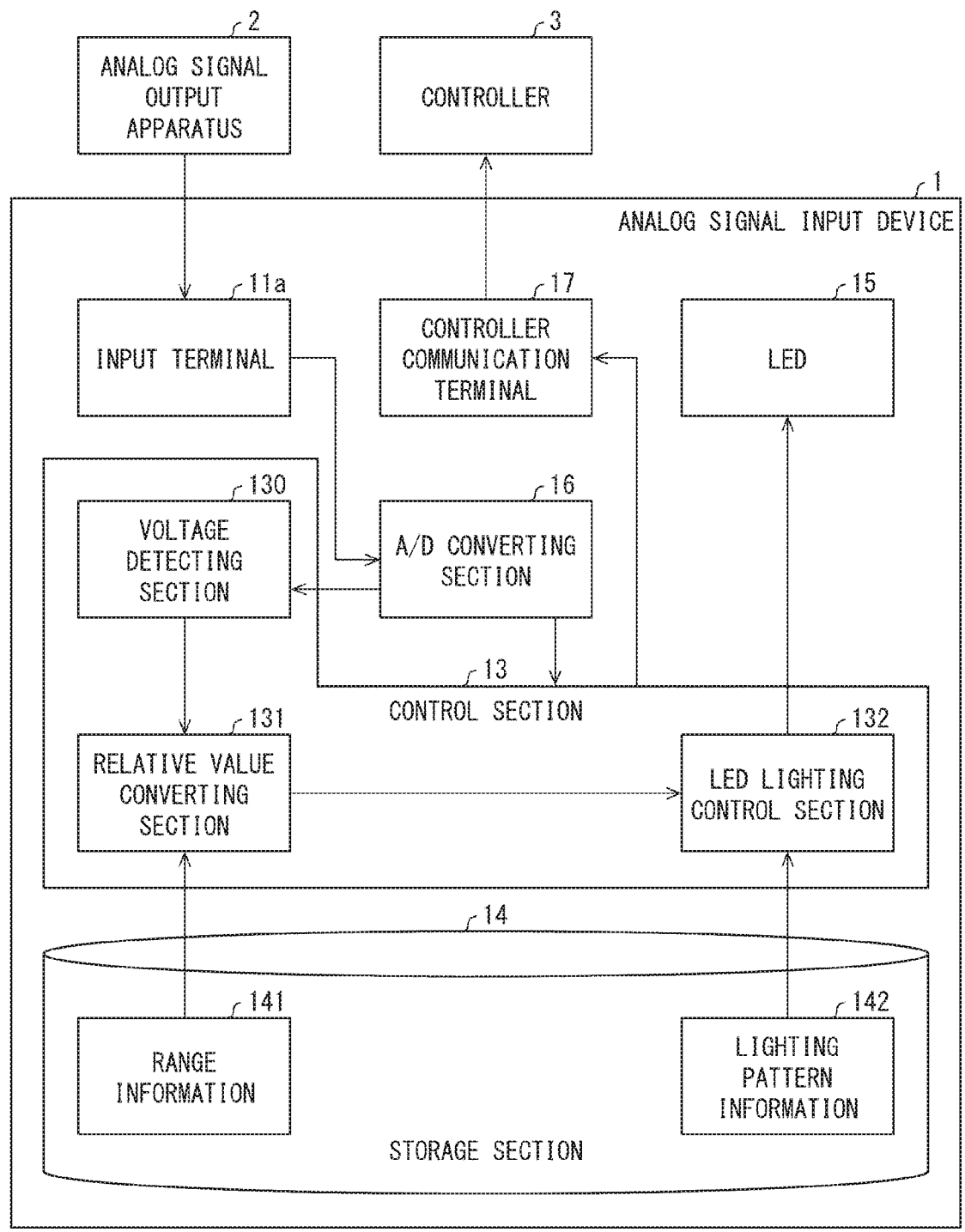
FIG. 1 is a block diagram illustrating one example of main components of an analog signal input device in accordance with an embodiment of the present invention.

FIG. 1 is a block diagram illustrating one example of main components of the analog signal input device 1 in accordance with the present embodiment. As described above, in the present embodiment, an example case where the analog signal input device 1 is an A/D converter for converting an inputted analog signal into a digital signal is provided.

As illustrated in FIGS. 1 and 2, the analog signal input device 1 includes an input terminal 11*a*, an output terminal 11*b*, a controller communication terminal 17, a control section 13, a storage section 14, the LED 15, and an A/D converting section 16.

(Input Terminal 11*a*, Output Terminal 11*b*, and Controller Communication Terminal 17)

The input terminal 11*a* accepts input of a signal from an external apparatus. In the present embodiment, the input terminal 11*a* particularly accepts input of an analog signal from the analog signal output apparatus 2. The output terminal 11*b* outputs output data to an external apparatus. Further, the controller communication terminal 17 outputs a digital signal to the controller 3 through the communication coupler 6. The input terminal 11*a*, the output terminal 11*b*, and the controller communication terminal 17 may be two or more input terminals 11*a*, two or more output terminals 11*b*, and two or more controller communication terminals 17, respectively, or may be a single input terminal 11a, a single output terminal 11b, and a single controller communication terminal 17, respectively.

(A/D Converting Section 16)

An analog signal (A)/digital signal (D) converting section 16 receives an analog signal from the analog signal output apparatus 2 through the input terminal 11a. The A/D converting section 16 converts the received analog signal into a digital signal. The A/D converting section 16 transmits the digital signal to the control section 13. In the present embodiment, the A/D converting section 16 transmits the digital signal to a voltage detecting section 130, in particular.

Further, the control section 13 may perform a filtering process or the like for removing noise of the digital signal. For example, the control section 13 transmits the digital signal subjected to the filtering process to the controller 3 through the controller communication terminal 17 and the communication coupler 6.

(Control Section 13)

The control section 13 includes a central processing unit (CPU), a random access memory (RAM), a read only memory (ROM) and others, and controls each of the constituent components in accordance with information processing. The control section 13 includes the voltage detecting section 130, a relative value converting section 131, and an LED lighting control section (light emission control section) 132.

(Voltage Detecting Section 130)

The voltage detecting section 130 detects an input level of an analog signal having been inputted through the input terminal 11a. Specifically, the voltage detecting section 130 detects a voltage level of the analog signal based on a digital signal having been received from the A/D converting section 16. The voltage detecting section 130 transmits the detected voltage level to the relative value converting section 131.

(Relative Value Converting Section 131)

The relative value converting section 131 converts an analog signal input or output level having been received from the voltage detecting section 130 into a relative value relative to one analog signal input/output level range which has been set through selection from among different analog signal input/output level ranges. This will be specifically discussed below.

FIG. 4 is a diagram showing correspondence between a voltage level of an analog input (input/output) signal and a relative value for the voltage level relative to a range. As shown in FIG. 4, in the present embodiment, the analog signal input (input/output) level range is set through selection from among the following ranges: range A (range of 0V to +10V); range B (range of 0V to +5V); and range C (range of −10V to +10V).

The analog signal input device 1 may be configured to set any of the input level ranges in response to a selection operation which has been performed by a user on the support tool 4 and then has been accepted by the analog signal input device 1. Alternatively, the analog signal input device 1 may be configured to accept input operations for a maximum value and a minimum value of the range on the support tool 4 and then set any input level range. For example, the set range may be stored as range information 141 in the storage section 14.

With the above-described configuration, it is possible to indicate an input or output level of an inputted or outputted analog signal in the range that the user desires.

The relative value converting section 131 refers to the range information 141 and then determines a relative value, for a voltage level of an analog signal, relative to the set range. For example, as shown in FIG. 4, in a case where the range A (range of 0V to +10V) is set, the relative value converting section 131 determines a relative value in a manner as described below. The relative value converting section 131 determines, on a percentage basis, a relative value for an inputted analog signal, on the assumption that 0 V, which is a minimum value of the range, is regarded as 0%, and +10 V, which is a maximum value of the range, is regarded as 100%. Further, in a case where the range B (range of 0V to +5V) is set, the relative value converting section 131 determines a relative value in a manner as described below. The relative value converting section 131 determines, on a percentage basis, a relative value for an inputted analog signal, on the assumption that 0 V, which is a minimum value of the range, is regarded as 0%, and +5 V, which is a maximum value of the range, is regarded as 100%. Further, in a case where the range C (range of −10V to +10V) is set, the relative value converting section 131 determines a relative value in a manner as described below. The relative value converting section 131 determines, on a percentage basis, a relative value for an inputted analog signal, on the assumption that −10 V, which is a minimum value of the range, is regarded as 0%, and +10 V, which is a maximum value of the range, is regarded as 100%. The relative value converting section 131 transmits, to the LED lighting control section 132, the determined relative value for the analog signal.

(LED Lighting Control Section 132)

The LED lighting control section 132 controls an on and off pattern of light emission of the light emitting element in accordance with an input level of an analog signal.

Specifically, the LED lighting control section 132 controls an on and off pattern of light emission of the LED 15 in accordance with a relative value having been received from the relative value converting section 131. For example, the LED lighting control section 132 may be configured to refer to lighting pattern information, stored in the storage section 14, indicative of lighting patterns of the LED 15 and then control light emission of the LED 15 in accordance with the lighting pattern information. The lighting pattern information 142 is information indicative of correspondences between the lighting patterns of the LED 15 and the relative values. The following description will discuss an example of a manner in which the LED lighting control section 132 performs on-off control of light emission of the LED 15.

Example 1 of Lighting Control of LED 15: Control of Turning-on Time and Turning-Off Time in a Predetermined Period of Time The LED lighting control section 132 may be configured to determine a turning-on (on) time of the LED 15 and a turning-off (off) time thereof in a predetermined period of time in accordance with the relative value (percentage) so as to control the turning on or blinking of the LED 15. For example, the LED lighting control section 132 controls the turning on and turning off of the LED 15 in a period of one second in a manner as described below. In a case where the relative value is 0%, the LED lighting control section 132 determines that the turning-off time is one second, and does not turn on the LED 15. In a case where the relative value is 10%, the LED lighting control section 132 determines that the turning-on time is 0.1 second and the turning-off time is 0.9 second, and causes the LED 15 to blink in accordance with the turning-on time and the turning-off time. In a case where the relative value is 90%, the LED lighting control section 132 determines that the turning-on time is 0.9 second and the turning-off time is 0.1 second, and causes the LED 15 to blink in accordance with the turning-on time and the turning-off time. In a case where the relative value is 100%, the LED lighting control section 132 determines that the turning-on time is one second, and turns on the LED 15 throughout the period of one second. That is, the LED lighting control section 132 performs control such that the length of the turning-on time of the LED 15 in a predetermined period of time increases with increase in the relative value.

Example 2 of Lighting Control of LED 15: Control of Blinking Period

Next, the following description will discuss another example of lighting control of the LED 15. The LED lighting control section 132 may be configured to determine a blinking period of the LED 15 in accordance with the relative value so as to control the turning on or blinking of the LED 15.

For example, in a case where the relative value is 0%, the LED lighting control section 132 does not turn on the LED 15. In a case where the relative value is 20%, the LED lighting control section 132 causes the LED 15 to blink by turning on the LED 15 for one second and turning off the LED 15 for one second. In a case where the relative value is 40%, the LED lighting control section 132 causes the LED 15 to blink by turning on the LED 15 for 0.8 second and turning off the LED 15 for 0.8 second. In a case where the relative value is 60%, the LED lighting control section 132 causes the LED 15 to blink by turning on the LED 15 for 0.6 second and turning off the LED 15 for 0.6 second. In a case where the relative value is 80%, the LED lighting control section 132 causes the LED 15 to blink by turning on the LED 15 for 0.4 second and turning off the LED 15 for 0.4 second. In a case where the relative value is 100%, the LED lighting control section 132 causes the LED 15 to blink by turning on the LED 15 for 0.2 second and turning off the LED 15 for 0.2 second. That is, the LED lighting control section 132 performs control such that the length of the blinking period of the LED 15 decreases with increase in the relative value.

With the above-described configurations, it is possible to indicate an input or output level in accordance with a relative value, for an input or output level, relative to one analog signal input/output level range which has been set through selection from among different analog signal input/output level ranges. That is, by changing the range setting, it is possible to indicate different analog signal input/output levels which correspond to the different ranges.

For example, the relative value converting section 131 may be configured such that, in a case where the level of an inputted analog signal falls outside a set range, the relative value converting section 131 does not determine a relative value. According to the above-described configuration, in a case where the inputted analog signal does not correspond to the set range, light emission of the LED 15 is not controlled. This allows a user to recognize that the inputted analog signal does not correspond to the set range.

Further, the analog signal input device 1 may be configured to input a plurality of analog input signals simultaneously. For example, the analog signal input device 1 may include a plurality of input terminals 11a and a plurality of LEDs 15. In this case, the input terminals 11a and the LEDs 15 may be in a one-to-one correspondence. The LED lighting control section 132 may control the lighting of the LEDs 15 corresponding to the input terminals 11a to indicate the levels of the analog input signals inputted through the input terminals 11a. In this configuration, information indicative of which of the LEDs 15 each of the input terminals 11a corresponds to may be stored in the storage section 14. The LED lighting control section 132 may be configured to refer to such information and then control lighting of the LEDs 15 in accordance with the information.

(Storage Section 14)

The storage section 14 is, for example, an auxiliary storage device such as a flash memory or a solid-state drive, and stores the above-described range information 141, the above-described lighting pattern information 142, and others.

(LED 15)

The LED 15 emits light under control of the LED lighting control section 132.

The LED 15 may be controlled to emit light even when any signal other than an analog signal is inputted or outputted. That is, the LED 15 may be shared not only for the purpose of indicating an input or output level of an analog signal but also for another purpose. For example, one LED 15 may emit light not only to indicate the input or output level of an analog signal but also to indicate the input of other signal (e.g., an external trigger signal). A signal targeted for input indication given by the LED 15 may be changed to another signal when a selection operation performed on the support tool 4 by the user is accepted.

The above-described configuration eliminates the need for installing a plurality of light emitting elements on a purpose by purpose basis. Therefore, it is possible to reduce the production cost, and it is also possible to contribute to space saving.

(Flow of Processes Carried Out by Analog Signal Input Device 1)

FIG. 5 is a flowchart illustrating one example of the flow of processes carried out by the analog signal input device 1 in accordance with the present embodiment. The following description will discuss, with reference to FIG. 5, one example of the flow of processes carried out by the analog signal input device 1. The voltage detecting section 130 detects a voltage level of an analog input signal (S1: input/output level detecting step). Subsequently, the relative value converting section 131 converts the voltage level of the analog input signal into a relative value (S2). Then, the LED lighting control section 132 turns on the LED 15 in a pattern which varies depending on the relative value (S3: light emission controlling step). In a case where the input of the analog signal has been completed (YES in S4), the process ends. Further, in a case where the input of the analog signal has not been completed (NO in S4), the process returns to S1.

[Software Implementation Example]

Control blocks of the analog signal input device 1 (particularly, the relative value converting section 131 and the LED lighting control section 132) can be realized by a logic circuit (hardware) provided in an integrated circuit (IC chip) or the like or can be alternatively realized by software.

In the latter case, the analog signal input device 1 includes a computer that executes instructions of a program that is software realizing the foregoing functions. The computer, for example, includes one or more processors and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

(Remarks)

The present invention can be expressed as follows.

An analog signal input/output device in accordance with an aspect of the present invention is an analog signal input/output device which includes a light emitting element and performs at least one of input and output of an analog signal, the analog signal input/output device including: an input/output level detecting section configured to detect at least one of an input level and an output level of the analog signal; and a light emission control section configured to control an on and off pattern of light emission of the light emitting element in accordance with the input level or the output level of the analog signal.

Further, a method of controlling an analog signal input/output device in accordance with an aspect of the present invention is a method of controlling an analog signal input/output device which includes a light emitting element and performs at least one of input and output of an analog signal, the method including: an input/output level detecting step of detecting at least one of an input level and an output level of the analog signal; and a light emission controlling step of controlling an on and off pattern of light emission of the light emitting element in accordance with the input level or the output level of the analog signal.

With the above-described configuration, it is possible to indicate the input level and/or the output level of the analog signal by a light emission pattern of one light emitting element. As such, the above-described configuration achieves reduction in production cost, in comparison to, for example, the configuration in which the input level and/or the output level of an analog signal is numerically displayed by a seven-segment LED, the configuration in which the input level and/or the output level of an analog signal is indicated by liquid crystal display, the configuration in which the input level and/or the output level of an analog signal is indicated by an analog meter or the like, and other configuration. Further, with the above-described configuration, it is possible to save space necessary for providing a configuration for indicating the input level and/or the output level of an analog signal. Therefore, it is possible to improve the degree of freedom in the design of the analog signal input/output device.

An analog signal input/output device in accordance with an aspect of the present invention includes a relative value converting section configured to convert a detected input or output level of the analog signal into a relative value relative to one analog signal input/output level range which has been set through selection from among different analog signal input/output level ranges, the light emission control section being configured to control the on and off pattern of the light emission of the light emitting element in accordance with the relative value.

With the above-described configuration, it is possible to indicate an analog signal input/output level in accordance with a relative value, for an input or output level, relative to one analog signal input/output level range which has been set through selection from among different analog signal input/output level ranges. That is, by changing the range setting, it is possible to indicate different analog signal input/output levels which correspond to the different ranges.

An analog signal input/output device in accordance with an aspect of the present invention is configured such that the one analog signal input/output level range is set in response to a selection operation which has been performed by a user and then has been accepted by the analog signal input/output device.

With the above-described configuration, it is possible to indicate an input or output level of an inputted or outputted analog signal in the range that the user desires.

An analog signal input/output device in accordance with an aspect of the present invention is configured such that the light emitting element is controlled to emit light even when any signal other than the analog signal is inputted or outputted.

The above-described configuration eliminates the need for installing a plurality of light emitting elements on a purpose by purpose basis. Therefore, it is possible to reduce the production cost of the analog signal input/output device, and it is also possible to contribute to space saving.

REFERENCE SIGNS LIST

1: Analog signal input device (analog signal input/output device)
4: Support tool (setting tool)
15: LED (light emitting element)
130: Voltage detecting section (input/output level detecting section)
131: Relative value converting section
132: LED lighting control section (light emission control section)
51: Input/output level detecting step
S3: Light emission controlling step

The invention claimed is:

1. An analog signal input/output device which includes a light emitting element and performs at least one of input and output of an analog signal,
the analog signal input/output device comprising:
an input/output level detecting section configured to detect at least one of an input level and an output level of the analog signal;
a relative value converting section configured to convert a detected input level or output level of the analog signal into a relative value comprising a percentage relative to a width of one analog signal input/output level range, which has been set through selection from among different analog signal input/output level ranges; and
a light emission control section configured to control an on and off pattern of light emission of the light emitting element in accordance with the input level or the output level of the analog signal, wherein
the light emission control section is configured to control the on and off pattern of the light emission of the light emitting element in accordance with the relative value.

2. The analog signal input/output device according to claim 1, wherein the one analog signal input/output level range is set in response to a user selection operation and has been accepted by the analog signal input/output device.

3. The analog signal input/output device according to claim 1, wherein the light emitting element is controlled to emit light when any signal other than the analog signal is inputted or outputted.

4. A method of controlling an analog signal input/output device, which includes a light emitting element and performs at least one of input and output of an analog signal, the method comprising:
- an input/output level detecting step of detecting at least one of an input level and an output level of the analog signal;
- a relative value converting step of converting a detected input level or output level of the analog signal into a relative value comprising a percentage relative to a width of one range which has been set through selection from among different analog signal input/output level ranges; and
- a light emission controlling step of controlling an on and off pattern of light emission of the light emitting element in accordance with the input level or the output level of the analog signal, wherein
- the light emission controlling step further comprises controlling the on and off pattern of the light emission of the light emitting element in accordance with the relative value.

* * * * *